[11] 3,594,622

[72] Inventor Junpei Inagaki
     Yokohama, Japan
[21] Appl. No. 13,733
[22] Filed Feb. 24, 1970
[45] Patented July 20, 1971
[73] Assignee Tokyo Shibaura Electric Co., Ltd.
     Kawasaki-shi, Japan
[32] Priority Feb. 24, 1969
[33] Japan
[31] 44/13165

[54] A LINEAR COMB-SHAPED SYNCHRONOUS MOTOR
     13 Claims, 10 Drawing Figs.
[52] U.S. Cl. ................................................... 318/135,
                            310/13, 310/257, 104/148
[51] Int. Cl. ..................................................... H02k 41/02
[50] Field of Search ............................................ 104/148,
     148 LM; 310/12—14, 257, 263; 318/135, 38

[56] References Cited
     UNITED STATES PATENTS
     448,598   3/1891   Wheeler et al. ............... 310/13
     2,870,349 1/1959   Rosenberg et al. ............ 310/13
     3,225,228 12/1965  Roshala ....................... 104/148 X
     3,321,652 5/1967   Opel ........................... 310/263 X 3,407,749 10/1968 Frig............................... 104/148
              FOREIGN PATENTS
938,028  9/1948  France ........................ 310/13

*Primary Examiner*—D. F. Duggan
*Attorney*—Oblon, Fisher and Spivak

ABSTRACT: In a linear comb-shaped synchronous motor, there is provided a linear comb-shaped reaction rail which includes a pair of elongated linear comb-shaped members, each of which also comprises an elongated yoke made of magnetic material and a plurality of poles similarly made of magnetic material integrally mounted on the yoke such that they and are respectively positioned on the yoke apart from each other with a predetermined interval are placed.

There is also provided DC exciting means having core the legs of which are respectively directed to the yokes in order to supply the DC excitation for the poles. All the poles integral with one of the comb-shaped members are excited to make the north poles, and on the other hand, all of the poles integral with the other of the comb-shaped members are similarly excited to make the south poles.

There is also provided an armature having an armature winding and positioned opposite the functional surface of the pole surfaces. The armature winding is energized from an AC power supply in such a manner that the directions of the armature currents are varied each time the armature passes through the alternately magnetized poles.

INVENTOR.
JUNPEI INAGAKI
BY
Oblon, Fisher & Spivak
ATTORNEYS 3,594,622

A LINEAR COMB-SHAPED SYNCHRONOUS MOTOR

BACKGROUND OF THE INVENTION

1. Field of the Invention

The present invention relates to a linear synchronous motor and particularly to a linear motor having a reaction rail in the form of comb-shaped pole members which are located along on a line.

2. Description of the Prior Art

There are known two types of exemplary linear motors, one of which is of a linear induction type and the other is a linear synchronous one. As is well known in the art, the linear induction motor shows undesirable starting characteristics, and it is difficult to provide a large gap length between the reaction rail and the armature thereof in order to prevent a decrease in the efficiency thereof. Thus, when the linear induction motor is employed as a drive for electric car equipment, troubles result from the prescribed smaller gap length between the reaction rail and the armature thereof when the car passes through curved tracks and also causes the rolling thereof.

On the other hand, the linear synchronous motor has some problems in that there is provided either exciting windings wound along the rail or permanent magnets buried along the same in order to provide the magnetic poles with alternately different polarities, as the poles are successively disposed along the lengthwise direction of the reaction rail. The arrangement where the exciting winding is placed along the rail, is expensive and that where the permanent magnets are placed along the rail causes a complicated procedure to manufacture the reaction rail. However, it should be noted that the latter arrangement can easily realize a higher performance than the former, even though the gap length will have to be selected to have a larger amplitude than in the former case.

SUMMARY OF THE INVENTION

It is therefore an object of the present invention to provide an improved linear synchronous motor in which linear comb-shaped pole members are employed as a reaction rail.

It is another object of the present invention to provide a linear synchronous motor which has higher performance characteristics than the prior linear induction motor, and is possible to manufacture with low cast due to an improved and new exciting device combined therewith.

Briefly stating the present invention, there is provided a linear reaction rail made of magnetic material. The linear reaction rail includes a first elongated comb-shaped member which comprises a first elongated yoke member and a plural number of first pole members integrally mounted with and protruding from the first yoke member such that they are located at one side and perpendicularly positioned to the lengthwise direction of the first yoke. The pole members are spaced apart from each other in the lengthwise direction such that a recess is provided between each of the successive poles. Similarly, the linear reaction rail also includes a second elongated comb-shaped member which comprises a second elongated yoke member and a plural number of second pole members in which the former and the latter are combined with each other in a similar manner to those of the first elongated yoke member. The first and second elongated comb-shaped members are so integrally combined with each other that their respective pole members engage so as to prevent each pole surface of one of the comb-shaped members from directly contacting the surfaces of the adjacent poles mounted on the other comb-shaped member, as well from contacting the yoke member of the same. There is provided means for supplying DC excitations to the comb-shaped members such that all the poles of one of the comb-shaped members are excited with a positive polarity and all the poles of the other with a negative one. There is also provided at least one armature with an AC armature winding wound thereon, the surface B which extends over at least two adjacent pole surfaces of the reaction rail. The armature is capable of moving relative to the reaction rail by maintaining air gaps between the armature surface and at least two pole surfaces successively located along the lengthwise direction of the reaction rail. There is lastly provided means for energizing the respective conductors of the armature winding from an AC power supply so that the same are energized according to predetermined sequences in accordance with the relative positions between the armature and the poles of the reaction rail.

BRIEF DESCRIPTION OF THE DRAWINGS

The present invention can be more fully understood from the following detailed description when taken in connection with reference to the accompanying drawings, in which.

DETAILED DESCRIPTION OF THE PREFERRED EMBODIMENTS

Figure 1:
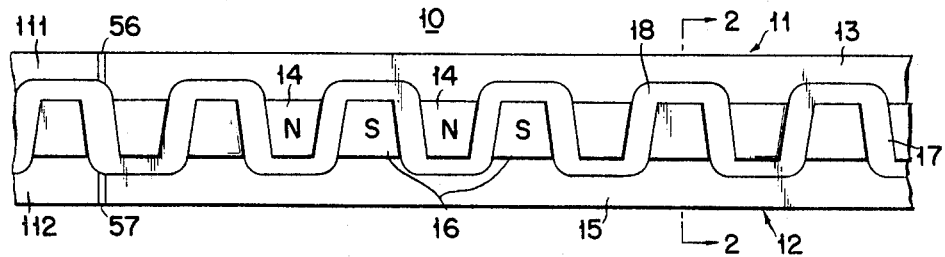
FIG. 1 is a side elevational view of a reaction rail embodying the present invention.

Referring now to FIG. 1, there is generally shown a reaction rail with reference numeral 10, which rail comprises a first elongated comb-shaped member 11 made of magnetic material, for example, casted steel, and a second elongated comb-shaped member 12 made of the same material.

The first comb-shaped member 11 made of cast-steel includes an elongated yoke 13 and a plural number of poles 14 integral with the yoke and distributed along the yoke by leaving any suitable space between successive poles. The second comb-shaped member 12 is also made of cast-steel and includes an elongated yoke 15 and a plural number of poles 16 distributed along the yoke in the same manner as described in the first member 11. Both members 11 and 12 are so overlapped with each other that each of poles 14 of member 11 is located between successive poles 16 of the other member 12 so as to result in a zigzag air gap 17 therebetween. There is provided a weblike nonmagnetic insulator 18 made of a material, for example, fiber glass reinforced polyester, aluminum, synthetic rubber, concrete, plastics and the like, to fill any space around the zigzag air gap 17 to prevent direct contact between both members 11 and 12, whereby the possibility of a magnetic short circuit which may occur therebetween is effectively reduced.

Upon the manufacture of the reaction rail by employing the weblike fiber glass reinforced polyester, the web 18 after it reaches a semihard state is positioned on the lower member 12. The upper member 11 is then placed upon the web 18 and the assembly is then pressed together until the predetermined dimension among the respective parts shown is reached. The assembly is then subjected to a heating process to further harden the web material. To integrally secure the parts 11, 12 and 18, many recesses are preferrably provided on the surfaces around the poles as well as on the surfaces between successive poles of the yokes, respectively.

It can be easily understood that both members 11 and 12 can be secured together by first positioning the same, and then by casting aluminum within the zigzag air gap 17. In this case, recesses or dimples may be preferably provided on the surfaces around the poles as well as on the surfaces between the successive poles, whereby the molten aluminum will enter therein and secure the parts together. It should be readily understood that synthetic rubber, concrete and plastics can be alternatively employed as the securing material instead of aluminum.

Figure 2:
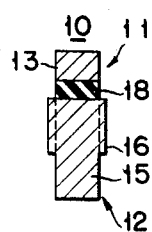
FIG. 2 is a sectional view taken along line 2-2 of FIG. 1.

As is clearly shown in FIG. 2, the poles The machining of the member 12 have a relatively larger width than the remaining portion thereof. This results in a need to polish only the opposite sides of the poles 16 so as to result by a machining process in exact pole surfaces. Thus, because the pole surfaces laterally protrude from the remaining surface of the member 12 and, it therefore only necessary to machine polish the sides of the poles, the costs for manufacturing the reaction rail can be effectively reduced. Of course, the sides of the poles 14 of the member 11 are machine polished in a similar fashion. The machining processes for the poles can be easily carried out at the same time after the integral assembling of the reaction rail 10.

Figure 3:
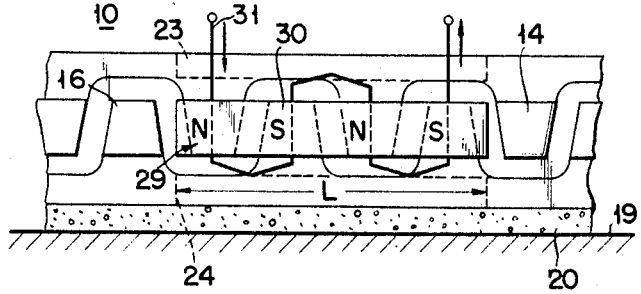
FIG. 3 shows relative arrangements of the reaction rail, an armature, an armature winding thereof and a DC exciting device for the reaction rail.
Figure 4:
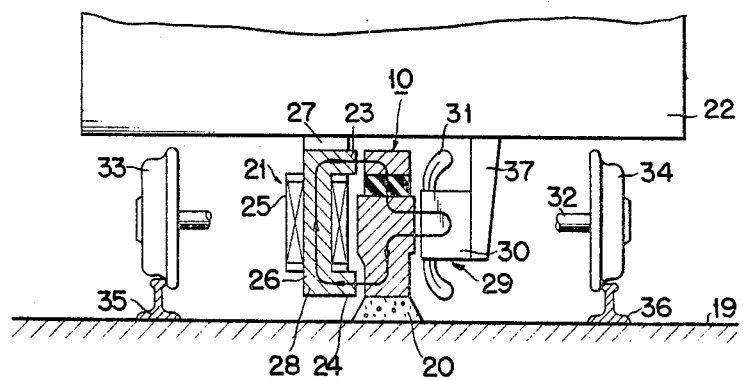
FIG. 4 shows an arrangement similar to that of FIG. 3, but including a front view of an electric car, partly in section and partly broken away, embodying the present invention.

As is shown in FIGS. 3 and 4, the reaction rail 10 may be secured to earth surface 19 by a concrete base 20. As can be seen in FIG. 4, there is provided a DC exciting device 21 which is suspended from the bottom of a car body 22 through a support 27. The exciting device includes a magnetic core 28 having a pair of legs 23 and 24 which are positioned opposite to the sides of the yokes of the reaction rail through respective relatively small air gaps. Also, a DC exciting coil 25 is wound around the yoke portion 26 and functions to mechanically and magnetically connect the opposite legs.

On the other hand, there is provided an armature 29 suspended from the bottom of the car body by a stay 37, which armature comprises a linear armature core 30 having one end surface positioned opposite to the pole surfaces of the poles 14 and 16 through a relatively small air gap and a polyphase armature winding 31 wound on the armature core at the same end surface thereof.

As is well known in the art, the car body 22 is suspended from wheel shaft 32 which has a pair of wheels 33 and 34 at opposite ends thereof. The wheels rotatably ride on rails 35 and 36.

As is clearly shown in FIG. 3, the armature core 30 of the armature 29 is extended along the lengthwise direction of the reaction rail and by way of example is shown as extending over two pairs of poles thereof. The pole length of the poles 23 and 24 of the DC exciting device 21 is also shown as extending respectively over two pairs of poles of the reaction rail. However, it should be understood that the length of these parts may be, of course, freely selected. In simplifying the illustration, the armature winding 31 is shown as located within one phase region only. However, it should be apparent that, a plural number of phase windings are employed in actual use. Also, for convenience of illustration, the winding 31 is shown in the most simplified form as a full wave winding. However, obviously the winding 31 can take various other kinds of forms, such for example, a lap winding, a chain winding or any suitable short pitch windings.

As shown in FIG. 3, four conductors of the winding 31 are positioned at the center of each pole. When the DC exciting coil 25 is excited from a DC power supply which may be located in the car body, the magnetic fluxes emanating from the coil 25 will flow through leg 23, the air gap defined between the end of leg 23 and one side of the yoke 13, yoke 13, poles 14, the air gap defined between north poles 14 and armature core 30, armature core 30, the air gap defined between armature core 30 and south poles 16, south poles 16, yoke 15 and the air gap defined between one side of the yoke 15 and the other leg 24 to the leg 24. Thus, all of the poles 14 of the member 11 become the north pole, whereas all of the poles 16 of the other member 12 become the south pole.

It is therefore easily understood that when electric currents flow through the armature winding as shown with arrows, the conductors of the winding would be induced with an electromagnetic force which in turn makes the armature 29 turn left in FIG. 3. The electric car can then move with the armature.

When the conductors of the armature winding reach near the edge of the poles, respectively, the prescribed electromagnetic force which was induced in the conductors of the winding 31 will be eliminated, and the other conductors of the winding associated with the next phase (not shown) may be subjected to the electrodynamic force which makes armature turn left.

It can be also understood that when the winding 31 is moved to the left by one pole pitch from the position as shown, that the foremost conductor of the winding will be induced with the DC fluxes from the south pole 16 instead of the prior north pole 14. Thus, all of the conductors of the winding 31 would be subjected to the DC magnetic fluxes having alternate polarities. In this case, it is necessary to change the polarity of the currents flowing through the winding 31 in order to move the armature in the same direction.

Figure 9:
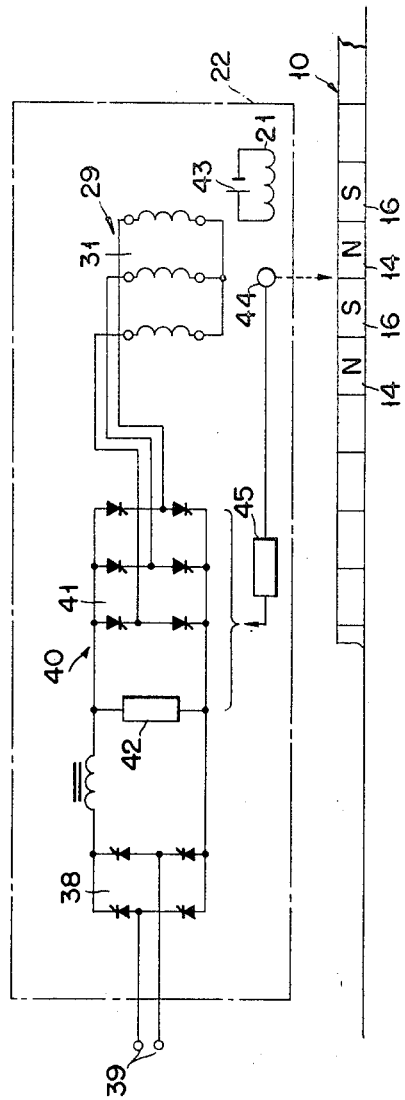
FIG. 9 is a simplified circuit diagram utilized to energize the armature of the linear synchronous motor.

To alternately present the armature winding at the exact phase positions in response to the polarities of DC fluxes emanating from the successive poles, it is preferable to employ a control circuit such for example of the type disclosed in FIG. 9.

In FIG. 9, the electric car is generally shown as a block 22, of a dot and dashed line, and includes a single phase type AC full wave rectifier 38, AC input terminals 39, which are connected between an AC power supply, by means of a combination of a catenary wire or a third rail and an earthed track (not shown). The full wave bridge rectifier 38 may be composed of four thyristors to supply DC variable voltages to an excited commutation-type three-phase thyristor inverter 40, which also includes six thyristors connected in a three-phase full wave bridge circuit 41 and an excited commutation circuit 42. As is well known in the art, the excited commutation circuit 42 has a capacitor unit (not shown) normally charged from the DC outputs of the rectifier 38 or another rectifier for supplying a charging voltage having a relatively constant DC voltage level and a switching thyristor unit in order to supply the excited commutation currents from the capacitor unit to the thyristors in the bridge circuit 41, the same being required to turn off the thyristors from turn-on conditions.

The outputs of the inverter 40 are connected to the inputs of the armature winding 30 of the linear synchronous motor, and the input power of the linear motor can be easily varied in accordance with the gate control for the bridge rectifier 38 such that the running speeds of the electric car can be smoothly varied.

The reaction rail 10 is magnetized from the DC exciting device 21 mounted upon the car body 22 in such a manner that the alternate poles 14 and 16 are fixedly excited so as to provide alternate north and south poles, that is, N and S. The DC electric power supply for the exciting device 21 is shown as a battery 43, but the latter may be formed by a diode bridge rectifier excited by the AC inputs 39 and further formed by a motor-generator set mounted on the car body.

To energize the armature winding 31 with a predetermined and exact sequence, there is provided an angular detector 44 which usually includes a pickup coil located near the pole surfaces of the reaction rail 10 and is mounted on the car body 22. Near the position of the pickup coil either a positive pulse or a negative pulse will appear every time said coil passes through the boundary between successive poles 14 and 16. These pulses are supplied to a gate control 45 to control the gates of the thyristors of the inverter 41 and the excited commutation circuit 42 at a predetermined sequence. The electric car then can continue moving in a satisfactory manner.

Where it is preferred to take a regenerative brake for the electric car, this can be easily accomplished by changing the operation of the rectifier 38 into the inverter and changing the inverter 41 into the rectifier.

Figure 5:
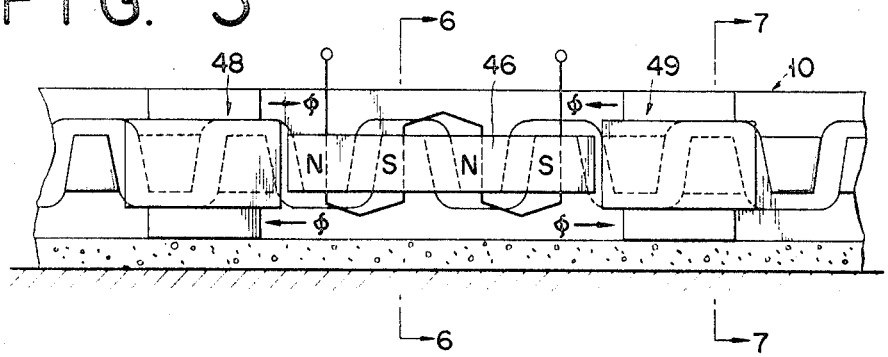
FIG. 5 shows another embodiment of the present invention in which a pair of DC exciting devices and a pair of armatures are combined with a reaction rail at opposite sides thereof.
Figure 6:
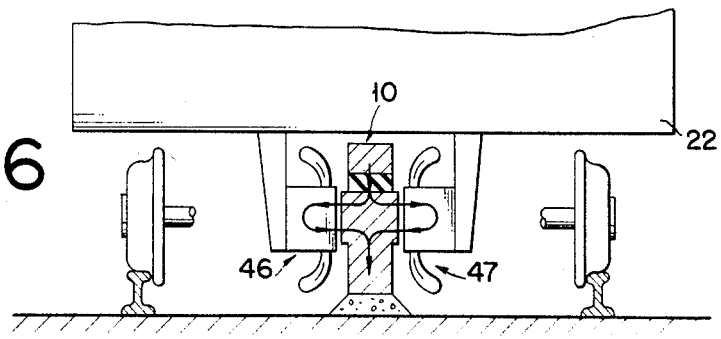
FIG. 6 shows a sectional view taken along line 6-6 of FIG. 5, partly in section and partly broken away, of an electric car similar to that of FIG. 4.
Figure 7:
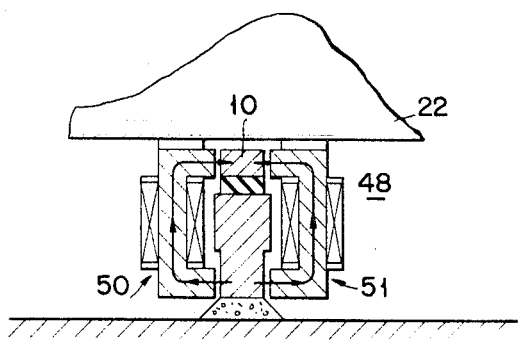
FIG. 7 is a cross-sectional view taken along line 7-7 of FIG. 5.

Referring now to another embodiment as shown in FIGS. 5, 6 and 7, similar parts are referred to by the same reference numerals as in FIGS. 1 to 4. In this embodiment, as is clear in FIG. 6, the linear synchronous motor to be employed for the electric car includes a pair of opposed linear armature structures 46 and 47 mounted on the flat bottom of the car, and the reaction rail 10 is interpositioned between the armatures. Also, there is provided two pairs of DC excitation means 48 and 49 mounted on the flat bottom of the car at opposite sides of the armatures along the lengthwise direction of the reaction rail 10 as is shown in FIG. 5. It can be seen that one of the DC excitation means 48 for the reaction rail also has a pair of opposed excitation devices 50 and 51 mounted on the flat bottom of the car body, and the reaction rail 10 is interpositioned between the pair of excitation devices through air gaps respectively.

According to this embodiment, because the electromagnetic means, which includes the DC excitation means and the armatures, is symmetrically provided at opposite sides of the reaction rail and positioned at a center position to the car body, little turn motion of the car will result from any unbalances in the electromagnetic forces. Also, it is possible with the subject embodiment to increase the traction forces of the car by a factory of about two over that of the car as described in FIG. 4.

Figure 8:
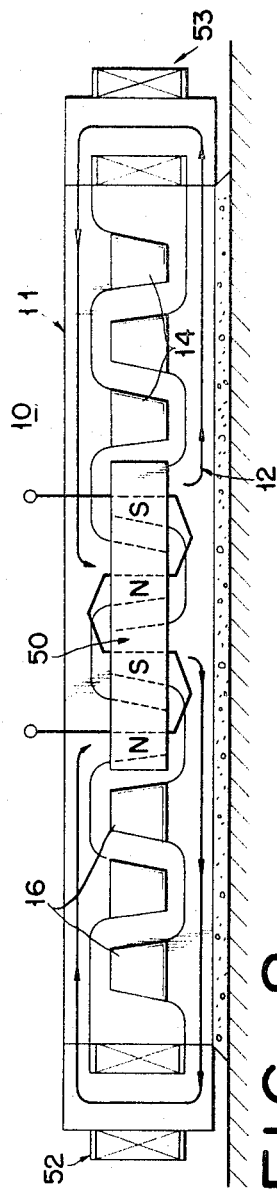
FIG. 8 is a side view of a linear synchronous motor embodying the present invention.

There is shown another type of the reaction rail 10 in FIG. 8, in which the constructions thereof and the connections between it and the armatures 50 are the same as those shown in FIG. 6, except there are provided a pair of DC excitation devices 52 and 53 at opposite ends of the rail. These excitation devices function to cause magnetic fluxes to flow sequentially through the upper yoke 11, the poles 14 integrally mounted thereon, the armature cores, the south poles 16 integrally mounted on the lower yoke 12 and again through the upper yoke II. It can be seen that the magnetic fluxes will only pass through where the armatures 50 are positioned. This is suited for linear motors for driving machine tools, in which the armatures 50 are movable along a limited stroke of the reaction rail.

Figure 10:
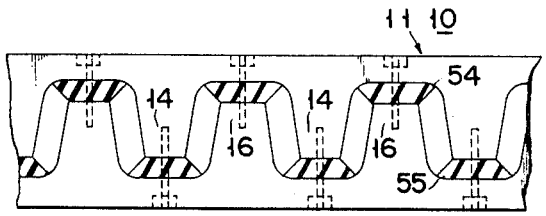
FIG. 10 shows a side elevational view of a reaction rail embodying the present invention.

FIG. 10 shows a further embodiment of the present invention. In this rail 10, there are interposed magnetic insulators 54 and 55 between the respective end surfaces of the poles 14 and 16 and the respective surfaces to be extended between the adjacent poles 14 and 16 of the first and second comb-shaped members 11 ad 12, respectively. The two members are then secured by means of studs, each of which is engaged respectively through the magnetic insulator into the pole at a position opposite to the yoke.

Referring again to FIG. 1, there are provided magnetic insulators 56 and 57 made of a material such, for example as, any suitable conductive adhesive, polyester resin involving metal power, or any other bond material having conductivity. The magnetic are provided the first comb-shaped members 11 and 111 as well as between the adjacent ones 12 and 112 to prevent any magnetic leakage fluxes which may flow between adjacent comb-shaped members. Thus, the magnetic fluxes emanating from the DC excitation device located within the car body can be effectively passed only through the armature of the car itself and thereby avoid losses.

It should be readily understood that the sides of the first yoke member could be employed as the third rail for storing the electric currents which are used to excite the linear synchronous motors and the other equipment of the car.

As described above, there is disclosed a new type reaction rail including first and second comb-shaped members, and thus the prescribed invention provides an improved comb-shaped linear synchronous motor in which a somewhat larger air gap between the armature and the rail is possible without any losses in the characteristics thereof. Also, because the reaction rail can be excited from the car side, it is possible to effectively reduce the DC excitation power and the capacity of the DC excitation power supply.

Obviously, numerous modifications and variations of the present invention are possible in the light of the above teachings. It is therefore to be understood that within the scope of the appended claims the invention may be practiced otherwise than as specifically described herein.

I claim:
1. In a linear comb-shaped synchronous motor having a reaction rail, armature means relatively movable to the rail and DC exciting means for the reaction rail to make alternately north and south poles along the rail, the improvements comprising:
   a first comb-shaped member made of magnetic material and including a first yoke member and a plural number of first poles integral with the first yoke member,
   a second comb-shaped member made of magnetic material and including a second yoke member and a plural number of second poles integral with the second yoke member,
   said first and second comb-shaped members being combined such that their comb-shaped poles are engaged not to magnetically contact each other,
   at least one armature having an armature winding to be energized from an AC power supply and having its surface having the winding thereon positioned to at least one pair of alternate poles of the first and second comb-shaped members, and DC exciting means for the first and second comb-shaped members, the magnetic fluxes emanating therefrom being passed through the first yoke, the first pole of the first yoke, the armature, the second pole of the second yoke and the second yoke, in turn.

2. In a linear comb-shaped synchronous motor according to claim 1 wherein:
   the first comb-shaped member is made of casting, and includes a first elongated yoke member and a plural number of first poles integral with the first yoke member,
   the first poles protruding from the first yoke in such a manner that they are positioned in a row and spaced apart from each other at a predetermined interval in the lengthwise direction of the first yoke,
   the second poles being formed integrally with the second yoke in the same manner as the prescribed first poles,
   said first and second poles having the same heights respectively, and the first and second comb-shaped members being overlapped and integrally secured with each other such that their surfaces having the protruding poles are positioned opposite to each other so as not to magnetically contact each other.

3. In a linear comb-shaped synchronous motor according to claim 2 wherein:
   the first and second elongated comb-shaped members are made of cast-steel.

4. In a linear comb-shaped synchronous motor according to claim 2 wherein:
   the first and second elongated comb-shaped members are so overlapped with each other that there results a zigzag space between the opposite surfaces thereof, which zigzag space functions as a magnetic insulation therebetween, and a weblike magnetic insulator located within said zigzag space.

5. In a linear comb-shaped synchronous motor according to claim 4 wherein:
   the weblike magnetic insulator is made of any one of casted aluminum, glass fiber reinforced polyester, synthetic rubbers, concrete and plastics as well as the combinations thereof.

6. In a linear comb-shaped synchronous motor according to claim 4 wherein:
   the weblike insulator is located between the first and second comb-shaped members to integrally secure the same.

7. In a linear comb-shaped synchronous motor according to claim 4 wherein:
   the magnetic insulators are partially located between the first and second elongated comb-shaped members, and fastening devices made of nonmagnetic material are provided between said comb-shaped members to integrally secure the same.

8. In a linear comb-shaped synchronous motor according to claim 1 wherein:
the reaction rail is composed of an upper yoke which includes the first group of poles integral therewith, and a lower yoke including the second group of poles integral therewith,
both of said yokes being overlapped so as to alternately engage the first poles with second poles respectively, but to avoid direct magnetic contact between them,
said reaction rail being vertically installed on a track such that the upper yoke is in an upper position and the lower yoke is in a lower position near the track,
at least one DC exciting device having a pair of legs and a yoke portion with a DC excitation winding, in which the end of one of the legs is directed to the one side of the first yoke and the end of the other is directed to the one side of the second yoke through respective air gaps,
at least one linear armature being positioned at the other side of the rail and opposite to the location of the DC excitation device and having a smaller air gap between the functional surface thereof and the pole surface of the rail, and wherein
said DC excitation device and the armature are mounted together on a body which is relatively movable to the rail.

9. In a linear comb-shaped synchronous motor according to claim 8 wherein:
DC excitation power supply means is mounted on said body to energize the DC excitation device,
AC power supply means is mounted on said body to energize the armature winding of the armature, and
electric angular position detector means is mounted on the body such that it is responsive to the relative positions between the armature and the comb-shaped poles of the rail and causes electrical signals to control the output frequencies and conductive directions of the AC output currents of the power supply.

10. In a linear comb-shaped synchronous motor according to claim 1 wherein:
the reaction rail is composed of an upper yoke which includes the first group of poles integral therewith and a lower yoke including a second group of poles integral therewith,
both of said yokes being overlapped so as to alternately engage the first poles with the second poles respectively, but to avoid direct magnetic contact between them,
said reaction rail being vertically installed on a track such that the upper yoke is in an upper position and the lower yoke is in a lower position near the track,
at least a pair of DC excitation devices respectively having a pair of legs and a yoke portion having a DC excitation winding and wherein the ends of the legs of one of said devices are respectively directed to the one side of the yokes of the rail and the ends of the legs of the other are respectively directed to the other side of the yokes of the rail, and
at least a pair of armatures located at opposite sides of the rail as as to position the functional surfaces thereof opposite to the poles, which armatures are positioned so as to be spaced from the DC excitation device along the lengthwise direction of the rail.

11. In a linear comb-shaped synchronous motor according to claim 10 wherein:
a DC excitation power supply means is mounted on said body to energize the DC excitation devices,
AC power supply means is mounted on said body to energize the armature windings of the armatures, and
electric angular position detector means is mounted on the body such that it is responsive to the relative positions between the armatures and the comb-shaped poles of the rail and causes the electrical signals to control the output frequencies and the conduction directions of the AC output currents of the AC power supply.

12. In a linear comb-shaped synchronous motor according to claim 1 wherein:
the reaction rail is divided into a plurality of longitudinal sections,
a magnetic insulator is located between adjacent sections, said insulator having good electric conductivity, a first comb-shaped member being located above the earth surface,
a second comb-shaped member being positioned near the earth,
whereby the first yoke of the first comb-shaped member is used as a third rail in order to share electric power from an external power supply, and the second yoke of the second comb-shaped member is used as a return-path for the electric current.

13. In a linear comb-shaped synchronous motor according to claim 1 wherein:
at least one DC excitation device is provided between one end of a pair of yokes of the reaction rail.